(12) United States Patent
Yi et al.

(10) Patent No.: US 7,653,283 B2
(45) Date of Patent: Jan. 26, 2010

(54) LIGHT PIPE MOUNTING INTERFACE

(75) Inventors: George Youzhi Yi, Fremont, CA (US); Truong Minh Doan, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 28 days.

(21) Appl. No.: 11/933,142

(22) Filed: Oct. 31, 2007

(65) Prior Publication Data

US 2009/0109700 A1 Apr. 30, 2009

(51) Int. Cl.
  *G02B 6/00* (2006.01)
(52) U.S. Cl. .................. 385/136; 385/134; 385/135
(58) Field of Classification Search ............. 385/134, 385/135, 136
  See application file for complete search history.

(56) References Cited

U.S. PATENT DOCUMENTS

| 4,302,069 | A | * | 11/1981 | Niemi ..................... 385/46 |
|---|---|---|---|---|
| 5,668,654 | A | * | 9/1997 | Benjamin et al. ........... 398/139 |
| 5,938,324 | A | | 8/1999 | Salmon et al. |
| 6,005,700 | A | | 12/1999 | Pressler et al. |
| 6,366,471 | B1 | | 4/2002 | Edwards et al. |
| 6,431,765 | B1 | | 8/2002 | Chen et al. |
| 2004/0170004 | A1 | | 9/2004 | Zimmerman et al. |
| 2007/0070644 | A1 | | 3/2007 | Beitelspacher |

* cited by examiner

*Primary Examiner*—Jennifer Doan
(74) *Attorney, Agent, or Firm*—Schwegman, Lundberg & Woessner, P.A.

(57) ABSTRACT

In an example embodiment, a light pipe mounting interface may include a support strip and at least one light pipe projecting from the support strip. The light pipe is to extend through a housing. A hook projects from the support strip to engage with the housing, and a cantilever snap head projects from an extension of the support strip to engage with the housing. The cantilever snap head and the hook lock the light pipe in a predetermined position with respect to the housing.

16 Claims, 7 Drawing Sheets

LIGHT PIPE MOUNTING INTERFACE

FIELD

The present disclosure relates generally to light pipes in electronic equipment.

BACKGROUND

A light pipe is a clear plastic part which conveys light from one location to another. In the context of electronic equipment, manufacturers commonly use light pipes to carry light from light emitting diodes (LEDs) on circuit boards to front panels or faceplates which are viewable by users of the electronic equipment. Accordingly, the manufacturers can enable the users to obtain useful visual information directly from the LEDs of the circuit boards even if the LEDs are nestled deeply behind the front panels or faceplates.

BRIEF DESCRIPTION OF DRAWINGS

Example embodiments are illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of example embodiments. It will be evident, however, to one skilled in the art that other embodiments may be practiced without these specific details.

Overview

A light pipe mounting interface and a method are described. The light pipe mounting interface may include a support strip and at least one light pipe projecting from the support strip. The light pipe is to extend through a housing. A hook projects from the support strip to engage with the housing, and a cantilever snap head projects from an extension of the support strip to engage with the housing. The cantilever snap head and the hook lock the light pipe in a predetermined position with respect to the housing.

The method may include positioning the light pipe mounting interface with respect to the housing such that the light pipe extends through a light pipe opening in the housing. The hook is positioned through a hook opening in the housing to engage with the housing. The mounting interface slides so that the cantilever snap head is deflected by the housing until the cantilever snap head slides into a snap head opening in the housing. The method engages the cantilever snap head and the hook with the housing.

Example Embodiments

Figure 1:
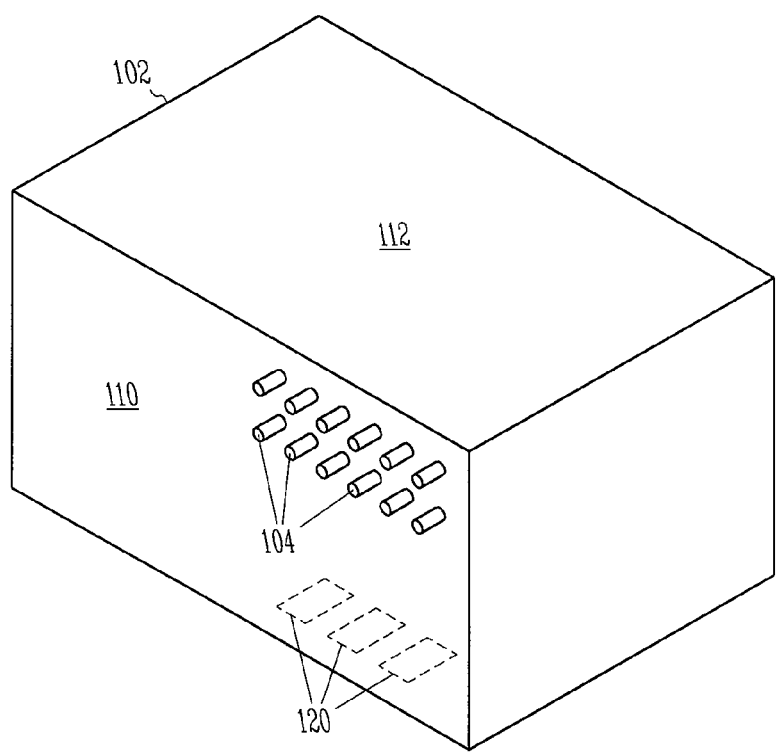
FIG. 1 shows a system including a housing with light pipes in accordance with an example embodiment.

FIG. 1 shows a system including a housing 102 with light pipes 104 in accordance with an example embodiment. The light pipes 104 are configured to extend through the housing 102. The housing 102 can be a sheet metal chassis with a front side 110 and a top 112 adjacent to the front side 110. The light pipes 104 are associated with respective light generating devices 120 inside the housing 102 and are located to convey light generated by the light generating devices 120 such that the light is visible from the front side 110 of the housing 102. The light generating devices 120 are controlled to generate light to provide indications of module functions, operations, status, or states of components in the housing 102. The light generating devices 120 may be light emitting diodes (LEDs) mounted on one or more printed circuit boards (not shown), or any other light source. The housing 102 encloses a router circuit to process electronic signals in accordance with an example embodiment.

Figure 2:
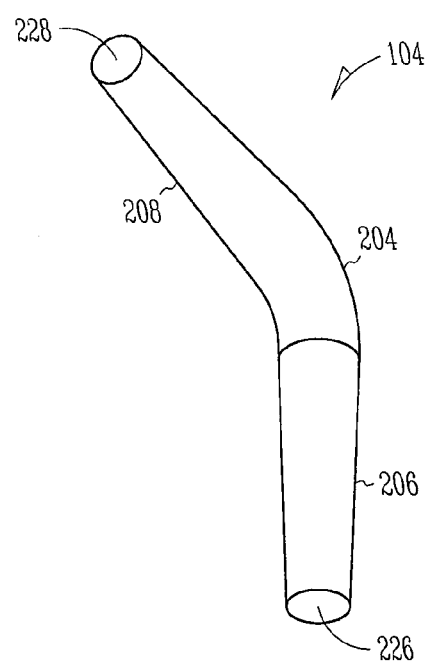
FIG. 2 shows a perspective view of a light pipe in accordance with an example embodiment.

FIG. 2 shows a perspective view of a light pipe 104 in accordance with an example embodiment. The light pipe 104 has a curved portion 204 which joins a first portion 206 and a second portion 208. The first portion 206 extends along a first axis from a first end 226, and the second portion 208 extends along a second axis from second end 228. The light pipe 104 has a circular cross-section in a plane orthogonal to the first axis and to the second axis. The light pipe 104 may also have a cross-section that is rectangular, oval, hexagonal, or any other geometry.

When the light pipe 104 is mounted so that the first end 226 is aligned with a light generating device 120, light from the light generating device 120 will enter the first end 226, be internally reflected along the first portion 206, the curved portion 204, and the second portion 208, and the light will exit from the second end 228.

The curvature and the angle formed by the curved portion 204 and the lengths of the first portion 206 and the second portion 208 may vary according to design requirements. In an alternate example embodiment (not shown), the light pipe 104 may be linear with all portions thereof disposed on a single axis.

The light pipe 104 may be formed of natural colored polycarbonate, clear polycarbonate, or clear acrylic, and may have a diameter of about 1 to 2 millimeters. In alternate example embodiments, the light pipe 104 may have a smaller or a larger diameter. As used herein, the term "about" means that the specified dimension or parameter may be varied within an acceptable manufacturing tolerance for a given application. In some example embodiments, the acceptable manufacturing tolerance is ±10%. The light pipe 104 may be formed by injection molding or numerically controlled machining or StereoLithography (SLA) for Rapid Precision Prototypes.

Figure 3:
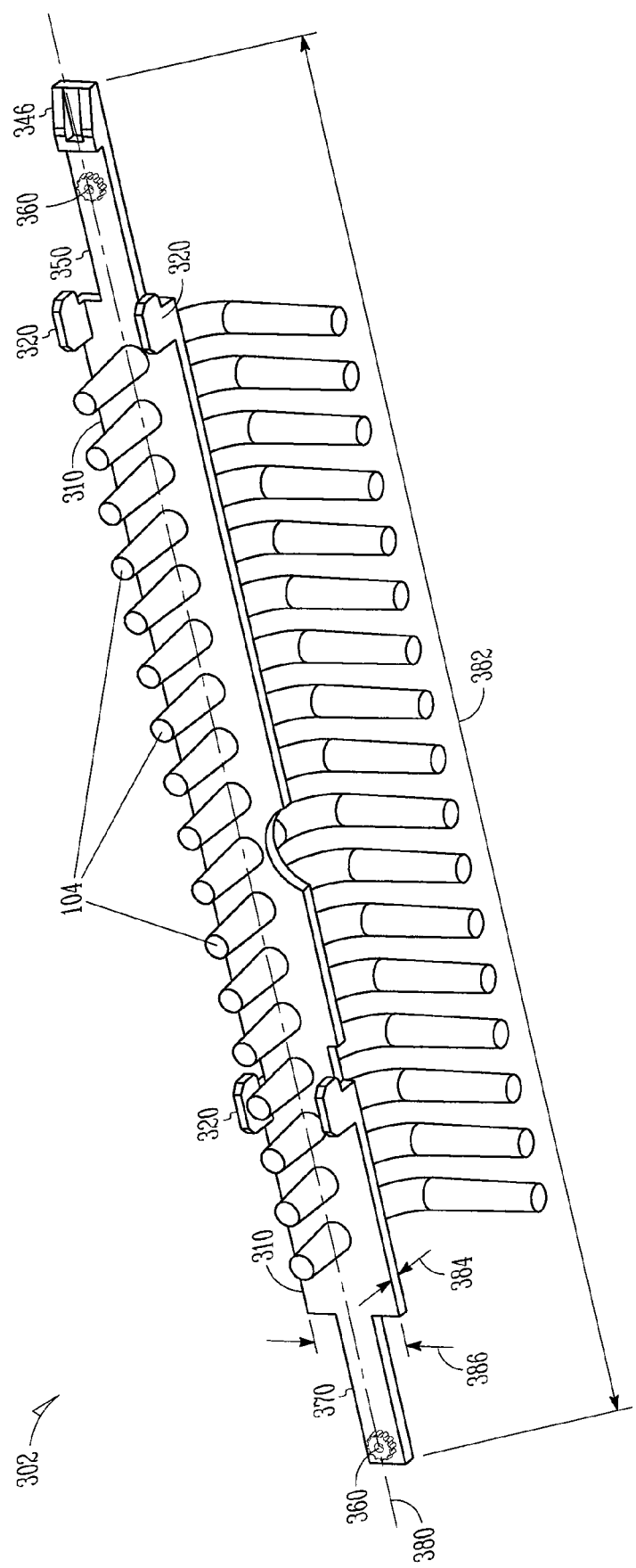
FIG. 3 shows a perspective view of a light pipe mounting interface in accordance with an example embodiment.

FIG. 3 shows a perspective view of a light pipe mounting interface (interface) 302 in accordance with an example embodiment. The interface 302 includes a number of light pipes 104 projecting from a support strip 310. The light pipes 104 are aligned in parallel with each other, although the light pipes 104 may not be aligned in parallel in other example embodiments. In some example embodiments, the light pipes 104 may be arranged in a two-dimensional array or pattern of light pipes 104. A number of hooks 320 project from the support strip 310 to engage the housing 102. A cantilever snap head 346 is an enlarged end projecting from a first extension 350 of the support strip 310 and extends from the first extension 350 in the manner of a cantilever beam. The cantilever snap head 346 may be deflected by the housing 102 to create tension in the cantilever snap head 346 and the first extension 350. The tension is released when the cantilever snap head 346 snaps into an opening in the housing 102. A number of knurled bosses 360 project from the first extension 350 and from a second extension 370 of the support strip 310 to position the interface 302 with respect to the housing 102. In alternate example embodiments, the knurled bosses 360 may be round, square, octagonal, or any other shape, and may be bosses without knurls.

The support strip 310 has a longitudinal axis 380 along a length 382, a width 384, and a height 386. The first extension 350 and the second extension 370 of the support strip 310 extend along the longitudinal axis 380 from respective ends of the support strip 310. The width 384 is an order of magnitude smaller than the length 382 and the height 386 has a magnitude between a magnitude of the width 384 and a magnitude of the length 382. In some example embodiments, an axis of each light pipe 104 is orthogonal to a plane of the interface 302 defined by the length 382 and the height 386. The knurled bosses 360, the hooks 320, and the cantilever snap head 346 project from the plane of the interface 302. In alternate example embodiments, the support strip 310 can have a different shape with different dimensions.

The hooks 320, the cantilever snap head 346, the light pipes 104, and the knurled bosses 360 are integrally formed with the support strip 310 in accordance with an example embodiment. In alternate example embodiments, the hooks 320, the cantilever snap head 346, the light pipes 104, the knurled bosses 360, and the support strip 310 are formed of natural colored polycarbonate, clear polycarbonate, or clear acrylic. In alternate example embodiments, the hooks 320, the cantilever snap head 346, the light pipes 104, and the knurled bosses 360 are formed with the support strip 310 by injection molding or numerically controlled machining or StereoLithography (SLA) for rapid precision prototypes. In alternate example embodiments, the hooks 320, the cantilever snap head 346, the light pipes 104, the knurled bosses 360, and the support strip 310 may be formed by other methods with other materials. In alternate example embodiments, the hooks 320, the cantilever snap head 346, the light pipes 104, the knurled bosses 360, and the support strip 310 may be separately formed and assembled together, and may not be of the same material.

Figure 4:
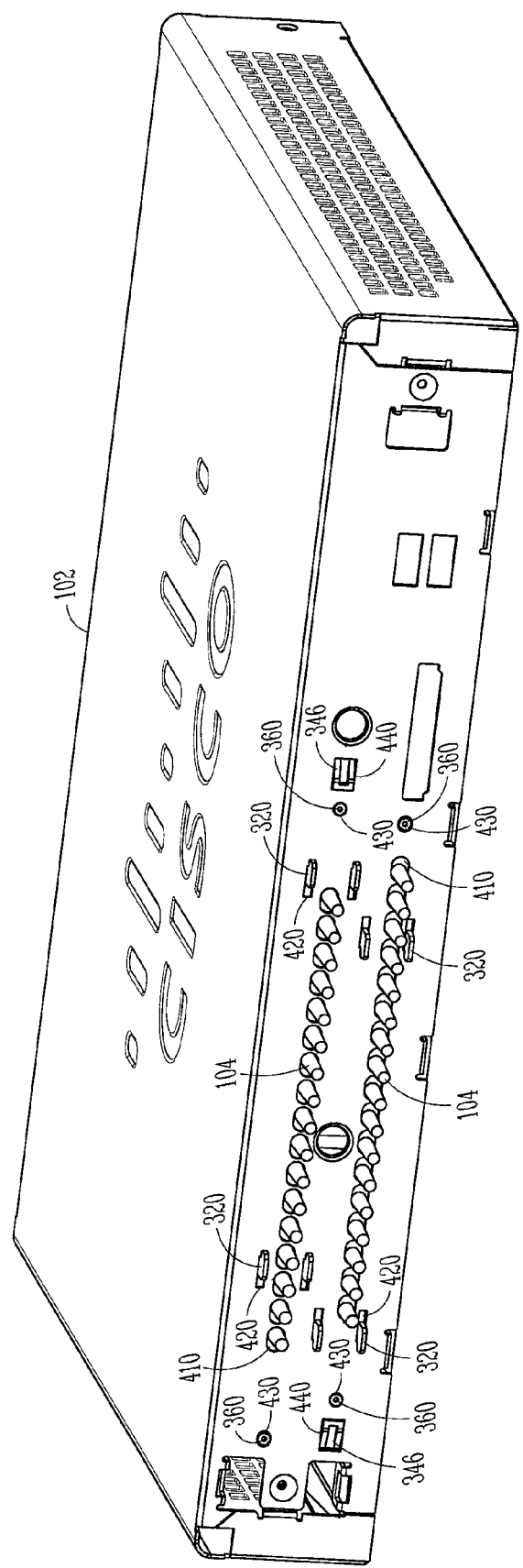
FIG. 4 shows a perspective view of two light pipe mounting interfaces engaged with a housing in accordance with an example embodiment.

FIG. 4 shows a perspective view of two interfaces 302 engaged with the housing 102 in accordance with an example embodiment. The light pipes 104 extend through respective light pipe openings 410 in the housing 102, each light pipe opening 410 being larger than its respective light pipe 104 to allow the light pipe 104 to move while extending through the light pipe opening 410 as the interface 302 is snapped into place. The light pipe openings 410 may have a round or oval geometry, or have a slot or a groove geometry with straight edges and semi-circular ends or have another geometry in accordance with example embodiments.

The hooks 320 extend into and engage a respective plurality of hook openings 420 in the housing 102. The hooks 320 may be of any shape capable of extending into and engaging the hook openings 420 in the housing 102. The hook openings 420 may have a slot or a groove geometry with straight edges and orthogonal ends or have another geometry in accordance with example embodiments. The knurled bosses 360 extend into respective locator openings 430 in the housing 102. The locator openings 430 have a geometry corresponding to an outer geometry of the respective knurled bosses 360 to position the interfaces 302 with respect to the housing 102. The cantilever snap heads 346 extend into and engage with respective snap head openings 440 in the housing 102. The snap head openings 440 have a geometry to engage with the cantilever snap heads 346 such that there is tension in each support strip 310 between the cantilever snap head 346 and the hooks 320 to lock the interface 302 with respect to the housing 102. The housing 102 can be a sheet metal chassis or any other suitable material to provide structural support in a chassis.

The light pipes 104 are positioned adjacent to light generating devices 120 (not shown) in the housing 102. The juxtaposition of each light pipe 104 with a respective light generating device 120 enables conveyance of light from the light generating device 120 along the light pipe 104. The light pipes 104 can collect light from light generating devices 120 on a printed circuit board (not shown) and redirect the light to a number of locations such that the light is visible from the front side 110 of the housing 102. The number of light pipes 104 in the interfaces 302 depends on design requirements. Thus, other example embodiments may have more or less of light pipes 104 in the interface 302.

Figure 5:
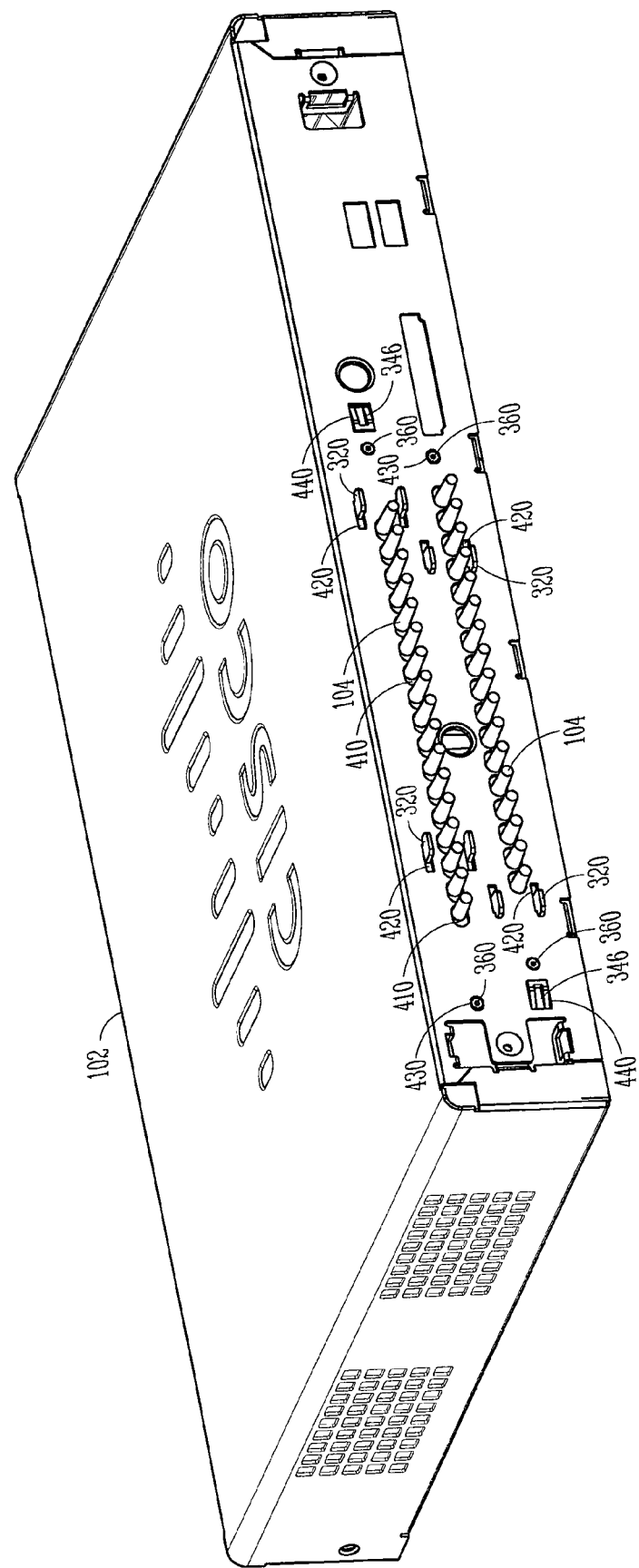
FIG. 5 shows a perspective view of two light pipe mounting interfaces engaged with a housing in accordance with an example embodiment.

FIG. 5 shows a perspective view of two interfaces 302 engaged with the housing 102 in accordance with an example embodiment. The view shown in FIG. 5 is from a different angle to that shown in FIG. 4, and all of the elements are the same as shown in FIG. 4.

Figure 6:
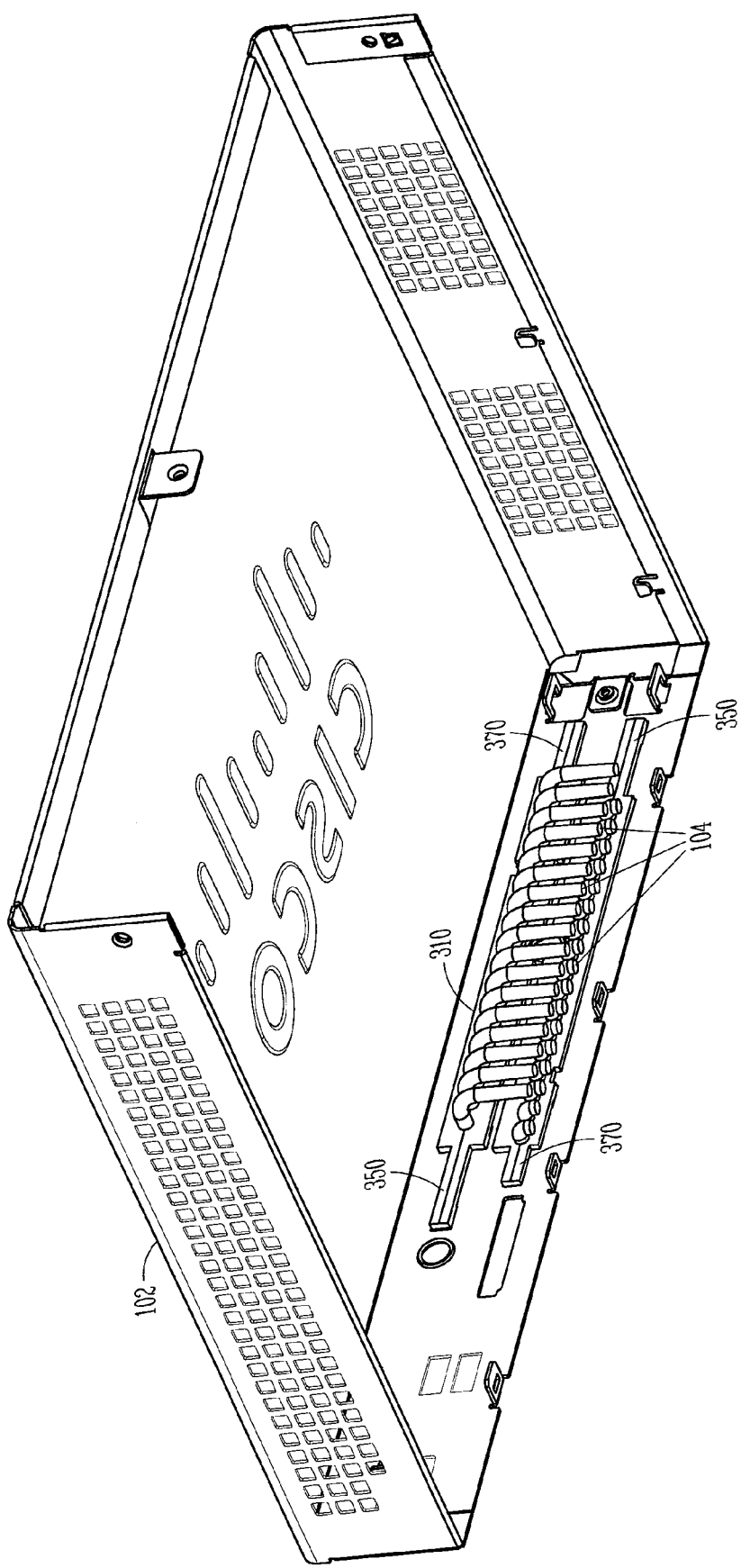
FIG. 6 shows a perspective view of two light pipe mounting interfaces engaged with a housing in accordance with an example embodiment.

FIG. 6 shows a perspective view of two interfaces 302 engaged with the housing 102 in accordance with an example embodiment. The view shown in FIG. 6 is from inside the housing 102, and includes the light pipes 104, the support strips 310, the first extensions 350, and the second extensions 370.

Figure 7:
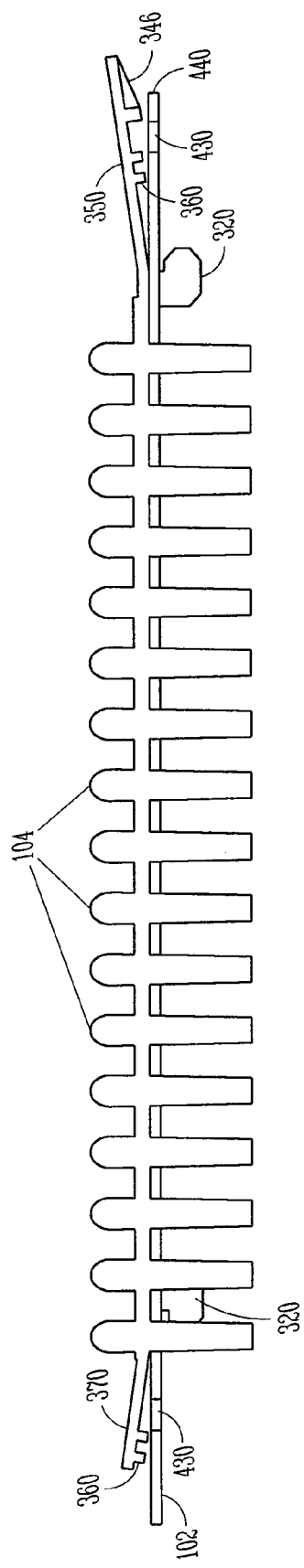
FIG. 7 shows a cross-sectional view of a light pipe mounting interface and a portion of a housing in accordance with an example embodiment.

FIG. 7 shows a cross-sectional view of the interface 302 and a portion of the housing 102 in accordance with an example embodiment. The first extension 350 with the cantilever snap head 346 is flexible and configured to be deflected away from the longitudinal axis 380 of the interface 302 when the cantilever snap head 346 is in contact with the housing 102 and the light pipes 104 extend through the light pipe openings 410.

Figure 8:
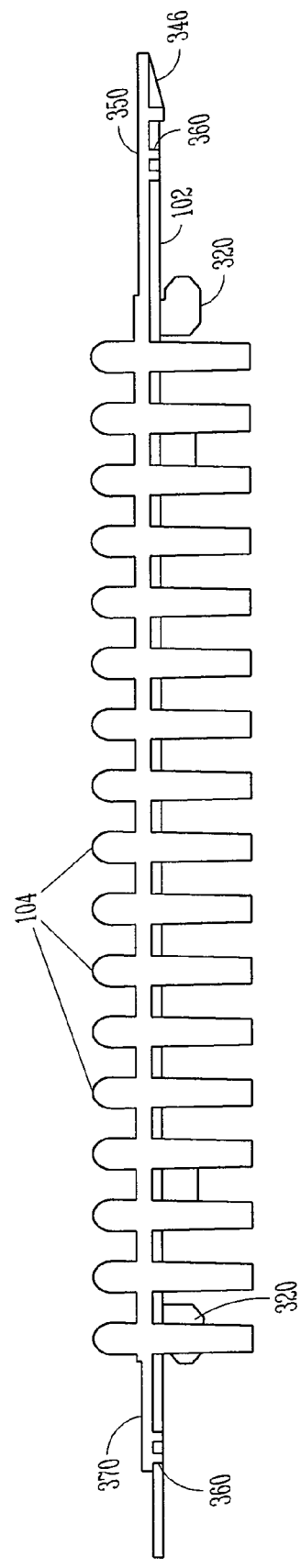
FIG. 8 shows a cross-sectional view of a light pipe mounting interface engaged with a portion of a housing in accordance with an example embodiment.

FIG. 8 shows a cross-sectional view of the interface 302 engaged with a portion of the housing 102 in accordance with an example embodiment. The deflection of the cantilever snap head 346 is substantially released or relaxed when the knurled bosses 360 extend into the respective locator openings 430 and the cantilever snap head 346 slides into the snap head opening 440 to lock the light pipes 104 in a predetermined position with respect to the housing 102. The cantilever snap head 346 acts like a detent or locking mechanism, engaging with the snap head opening 440 in the housing 102. The plane of the interface 302 is approximately parallel to the housing 102 when the light pipes 104 are locked such that the axis of each light pipe 104 is approximately orthogonal to the front side 110 of the housing 102.

Figure 9:
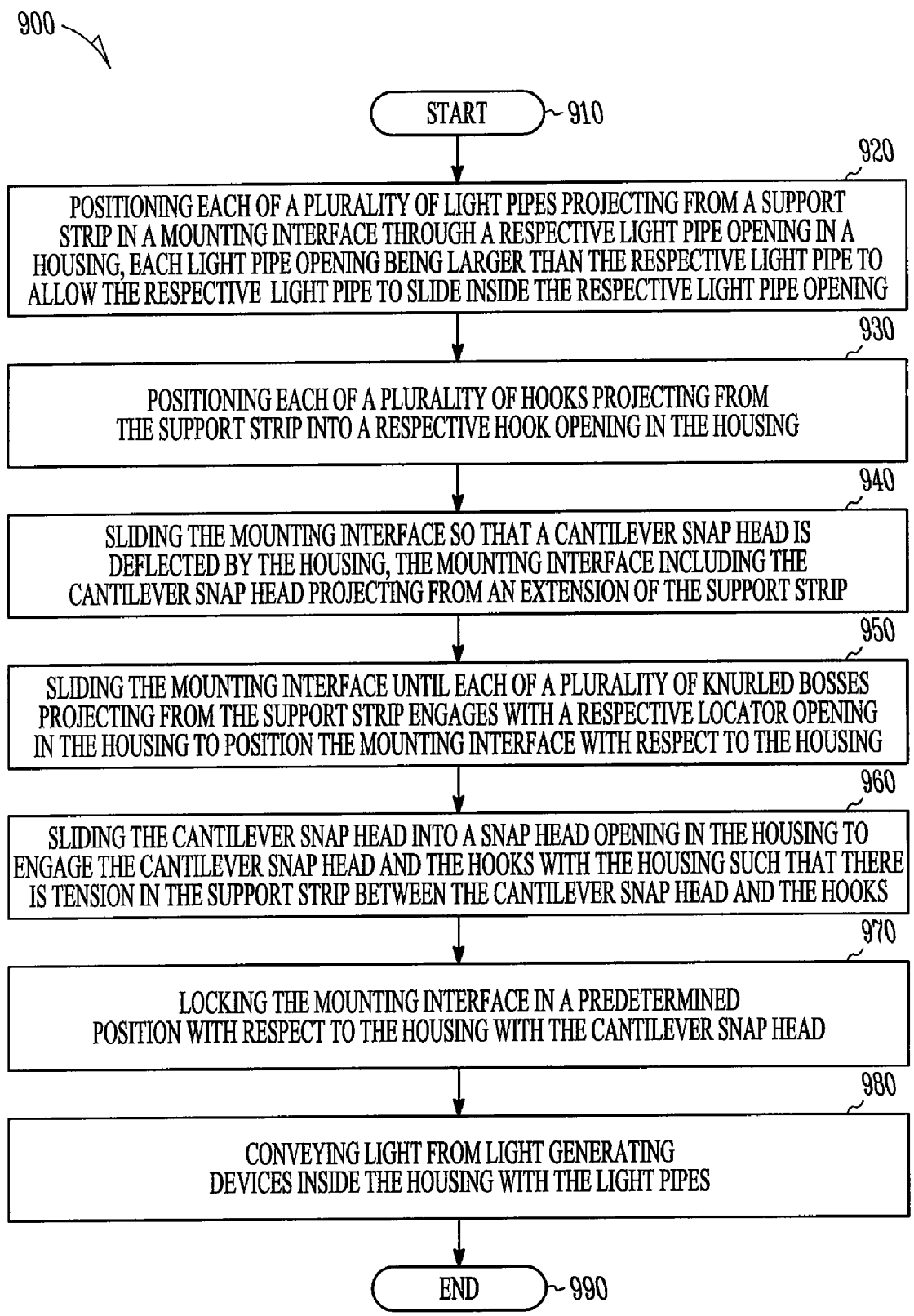
FIG. 9 shows a flow diagram of several methods in accordance with example embodiments.

FIG. 9 shows a flow diagram of several methods 900 in accordance with example embodiments. In block 910, the methods 900 start.

In block 920, each of the light pipes 104 is positioned to project from the support strip 310 in the interface 302 through a respective light pipe opening 410 in the housing 102. Each light pipe opening 410 is larger that the respective light pipe 104 to allow the respective light pipe 104 to slide inside the respective light pipe opening 410.

In block 930, each of a plurality of hooks 320 is positioned to project from the support strip 310 into a respective hook opening 420 in the housing 102.

In block 940, the interface 302 is caused to slide so that the cantilever snap head 346 is deflected by the housing 102, the interface 302 including the cantilever snap head 346 projecting from an extension of the support strip 310.

In block 950, the interface 302 is caused to slide until each of a plurality of knurled bosses 360 projecting from the support strip 310 engages with a respective locator opening 430 in the housing 102 to position the interface 302 with respect to the housing 102.

In block 960, the cantilever snap head 346 is caused to slide into a snap head opening 440 in the housing 102 to engage the cantilever snap head 346 and the hooks 320 with the housing 102 such that there is tension in the support strip 310 between the cantilever snap head 346 and the hooks 320.

In block 970, the interface 302 is locked in a predetermined position with respect to the housing 102 with the cantilever snap head 346.

In block 980, the light pipes 104 convey light from the light generating devices 120 inside the housing 102. In block 990, the methods 900 end.

The retention mechanisms of the interface 302 in conjunction with the light pipes 104 in accordance with the example embodiments described herein are simple, cost saving, and robust. The interface 302 shown and described herein enables the light pipes 104 to be robustly mounted to the housing 102. The interface 302 has a horizontal cantilever design that takes up very little vertical space. The knurled bosses 360 precisely position the light pipes 104. The hooks 320 fasten the light pipes 104 robustly. Simple slide-snap-fit installation is expressed by the methods 900. The interface 302 and methods 900 simplify assembly operations and reduce the cost of assembling the light pipes 104 and the housing 102. The interface 302 may be installed at a contractor manufacturer which cuts the cost of operation and inventory.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in single embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of any single disclosed embodiment. Thus the following claims are hereby incorporated into the Detailed Description, with each claim standing on its own as a separate embodiment.

The invention claimed is:

1. An apparatus comprising:
a light pipe mounting interface including a support strip and at least one light pipe projecting from the support strip, the light pipe being configured to extend through a housing;
a hook projecting from the support strip and configured to engage with the housing; and
a cantilever snap head projecting from an extension of the support strip and configured to engage with the housing, the cantilever snap head and the hook being configured to lock the light pipe in a predetermined position with respect to the housing.

2. The apparatus as claimed in claim 1, further comprising a protrusion from the support strip configured to position the light pipe mounting interface with respect to the housing.

3. The apparatus as claimed in claim 2, wherein the protrusion includes a knurled boss configured to position the light pipe mounting interface with respect to a boss opening in the housing.

4. The apparatus as claimed in claim 1, wherein:
the support strip has a length along a longitudinal axis, a width, and a height;
the extension of the support strip extends along the longitudinal axis from an end of the support strip; and
the width is an order of magnitude smaller than the length of the support strip and the height has a magnitude between a magnitude of the width and a magnitude of the length.

5. The apparatus as claimed in claim 2, wherein the hook, the cantilever snap head, the light pipe, and the protrusion are integrally formed with the support strip.

6. The apparatus as claimed in claim 1, further comprising:
a plurality of hooks projecting from the support strip and configured to engage the housing;
a plurality of knurled bosses projecting from the support strip and configured to position the light pipe mounting interface with respect to a plurality of boss openings in the housing; and
a plurality of light pipes projecting from the support strip and configured to extend through the housing to be locked in a predetermined position with respect to the housing by the plurality of hooks and the cantilever snap head.

7. The apparatus as claimed in claim 6, wherein the hooks, the cantilever snap head, the light pipes, and the knurled bosses are formed with the support strip by injection molding of a material selected from the group consisting of one or more of natural colored polycarbonate, clear polycarbonate, and clear acrylic, in any combination.

8. The apparatus as claimed in claim 1, wherein the cantilever snap head is flexible and configured to be deflected away from a longitudinal axis of the support strip when the cantilever snap head is in contact with the housing, the deflection being substantially released when the cantilever snap head slides into an opening in the housing to lock the light pipe in a predetermined position with respect to the housing.

9. A system comprising:
a light pipe mounting interface including a support strip;
a cantilever snap head projecting from an extension of the support strip and configured to engage with a housing;
a plurality of hooks projecting from the support strip and configured to engage the housing;
a plurality of knurled bosses projecting from the support strip and configured to position the light pipe mounting interface with respect to a plurality of boss openings in the housing;
a plurality of light pipes projecting from the support strip and configured to extend through the housing to be locked in a predetermined position with respect to the housing by the hooks and the cantilever snap head; and
wherein:
the housing includes a sheet metal chassis;
the light pipes extend through at least one respective light pipe opening in the housing, each light pipe opening being larger than its respective light pipe to allow the light pipe to move while extending through the light pipe opening;

the hooks extend into and engage a respective plurality of hook openings in the housing;

the knurled bosses extend into respective locator openings in the housing; and the cantilever snap head extends into and engages a snap head opening in the housing.

10. The system as claimed in claim 9, wherein the light pipes are aligned in parallel with each other.

11. The system as claimed in claim 9, further comprising a further light pipe mounting interface including:

a plurality of light pipes projecting from the further light pipe mounting interface and configured to extend through a plurality of respective light pipe openings in the housing, each light pipe opening being larger than the respective light pipe to allow the light pipe to move while extending through the light pipe opening;

a plurality of hooks projecting from the further light pipe mounting interface extending into and engaging a respective plurality of hook openings in the housing;

a plurality of knurled bosses projecting from the further light pipe mounting interface extending into respective locator openings in the housing;

a cantilever snap head projecting from an extension of the further light pipe mounting interface extending into and engaging a snap head opening in the housing, the light pipes being locked in a predetermined position with respect to the housing by the hooks and the cantilever snap head; and wherein the light pipe mounting interface is located adjacent to the further light pipe mounting interface in the housing, the cantilever snap head of the light pipe mounting interface being adjacent to an end of the further light pipe mounting interface opposite to the cantilever snap head of the further light pipe mounting interface.

12. A method comprising:

positioning a light pipe mounting interface including at least one light pipe projecting from a support strip with respect to a housing such that the light pipe extends through a light pipe opening in the housing;

positioning a hook projecting from the support strip through a hook opening in the housing to engage with the housing; and sliding the light pipe mounting interface including a cantilever snap head projecting from an extension of the support strip so that the cantilever snap head is deflected by the housing until the cantilever snap head slides into a snap head opening in the housing to engage the cantilever snap head and the hook with the housing to lock the light pipe in a predetermined position with respect to the housing.

13. The method as claimed in claim 12, further comprising sliding the light pipe mounting interface until a protrusion from the support strip engages with a locator opening in the housing to position the light pipe mounting interface with respect to the housing.

14. The method as claimed in claim 12, wherein:

positioning the light pipe mounting interface includes positioning each of a plurality of light pipes projecting from the support strip through a respective light pipe opening in the housing, each light pipe opening being larger that the respective light pipe to allow the respective light pipe to slide inside the respective light pipe opening;

positioning the hook includes positioning each of a plurality of hooks projecting from the support strip in a respective hook opening in the housing; and sliding the light pipe mounting interface includes sliding the light pipe mounting interface until each of a plurality of knurled bosses projecting from the support strip engages with a respective locator opening in the housing to position the light pipe mounting interface with respect to the housing.

15. The method as claimed in claim 12, further comprising sliding the light pipe mounting interface until there is tension in the support strip between the cantilever snap head and the hook to lock the light pipe mounting interface with respect to the housing.

16. The method as claimed in claim 12, further comprising conveying light from a light generating device inside the housing with the light pipe.

* * * * *